(12) United States Patent
Nichols et al.

(10) Patent No.: US 7,151,121 B2
(45) Date of Patent: Dec. 19, 2006

(54) POLYURETHANE CONTAINING A POLYOL COMPOSITION COMPRISING A HIGHLY BRANCHED POLYSACCHARIDE, MIX AND PROCESS FOR PREPARATION THEREOF

(75) Inventors: Charles M. Nichols, Terre Haute, IN (US); Kenneth F. Knoblock, Terre Haute, IN (US); David D. Russell, Akron, OH (US); James M. O'Connor, Cheshire, CT (US); Alexander McLauchlin, Cheshire, CT (US)

(73) Assignee: Danisco A/S, Copenhagen (DK)

( * ) Notice: Subject to any disclaimer, the term of this patent is extended or adjusted under 35 U.S.C. 154(b) by 30 days.

(21) Appl. No.: 10/854,595

(22) Filed: May 26, 2004

(65) Prior Publication Data

US 2005/0267278 A1     Dec. 1, 2005

(51) Int. Cl.
C08G 18/48         (2006.01)
(52) U.S. Cl. .................. 521/155; 521/175; 528/79; 528/85
(58) Field of Classification Search ................ 521/155, 521/175; 528/85, 79
See application file for complete search history.

(56) References Cited

U.S. PATENT DOCUMENTS

| | | |
|---|---|---|
| 2,436,967 A | 3/1948 | Leuck |
| 2,719,179 A | 9/1955 | Mora et al. |
| 3,459,731 A * | 8/1969 | Caimi et al. ................ 536/103 |
| 3,766,165 A | 10/1973 | Rennhard et al. |
| 3,956,202 A | 5/1976 | Iwasaki |
| 4,197,372 A | 4/1980 | Hostettler |
| 4,237,182 A | 12/1980 | Fulmer et al. |
| 4,400,475 A | 8/1983 | Kennedy |
| 4,401,772 A | 8/1983 | Fuzesi et al. |
| 4,404,294 A | 9/1983 | Wiedermann |
| 4,404,295 A | 9/1983 | Bernstein et al. |
| 4,417,998 A | 11/1983 | Kennedy |
| 4,458,034 A | 7/1984 | Fracalossi et al. |
| RE31,757 E | 12/1984 | Kennedy |
| 4,520,139 A | 5/1985 | Kennedy |
| 4,585,858 A | 4/1986 | Molotsky |
| 4,622,233 A | 11/1986 | Torres |
| 4,654,375 A | 3/1987 | Malwitz |
| 4,943,597 A | 7/1990 | Grunbauer et al. |
| 4,948,596 A | 8/1990 | Bunick et al. |
| 4,956,458 A | 9/1990 | Luo et al. |
| 4,965,354 A | 10/1990 | Yanaki et al. |
| 5,051,500 A | 9/1991 | Elmore |
| 5,091,015 A | 2/1992 | Bunick et al. |
| 5,162,286 A | 11/1992 | MacDowall |
| 5,185,383 A | 2/1993 | Regenauer |
| 5,273,772 A | 12/1993 | Cooper |
| 5,378,491 A | 1/1995 | Stanley et al. |
| 5,424,418 A | 6/1995 | Duflot |
| 5,573,794 A | 11/1996 | Duflot |
| 5,601,863 A | 2/1997 | Borden et al. |
| 5,620,871 A | 4/1997 | Caboche |
| 5,645,647 A | 7/1997 | Guzek et al. |
| 5,667,593 A | 9/1997 | Guzek et al. |
| 5,686,500 A | 11/1997 | Fishback et al. |
| 5,690,855 A | 11/1997 | Nichols et al. |
| 5,773,604 A | 6/1998 | Lefevre et al. |
| 6,232,356 B1 | 5/2001 | Mercando et al. |
| 6,475,552 B1 | 11/2002 | Shah et al. |
| 2004/0014829 A1 | 1/2004 | Neff et al. |

FOREIGN PATENT DOCUMENTS

| | | |
|---|---|---|
| DE | 198 24 134 A1 | 12/1999 |
| EP | 0 289 461 | 11/1988 |
| WO | WO 92/12179 | 7/1992 |
| WO | WO 2004/009671 | 1/2004 |

OTHER PUBLICATIONS

R.L. Cunningham, et al., *Journal of Applied Polymer Science*, vol. 69: 957-964, 1998.
M.J. Donnelly, et al, *Carbohydrate Polymers*, "The Conversion of Polysaccharides into Polyurethanes: A Review", 14, No. 3, pp. 221-240 (1990).

* cited by examiner

Primary Examiner—Rachel Gorr
(74) Attorney, Agent, or Firm—Scully, Scott, Murphy & Presser, PC (57) ABSTRACT

The invention relates to a polyurethane obtainable by reacting a polyisocyanate and a polyol composition comprising a highly branched polysaccharide of randomly bonded glucopyranose units or an alkoxylated derivative of the same. The polysaccharide has an average number of 10–100 glucose residues and said polysaccharide and derivative both have an average functionality of 30 or more. The invention also relates to a process for the production of such a polyurethane as well as a mix for the production of a polyurethane comprising a polyol composition, comprising 2–100 % of a highly branched polysaccharide, at least one catalyst and at least one surfactant.

55 Claims, 2 Drawing Sheets

Figure 1. Summary of Linkage and Branching for Fibersol-2® and Polydextrose.

Figure 2. Summary of Linkage Distribution for Fibersol-2® and Polydextrose.

POLYURETHANE CONTAINING A POLYOL COMPOSITION COMPRISING A HIGHLY BRANCHED POLYSACCHARIDE, MIX AND PROCESS FOR PREPARATION THEREOF

FIELD OF THE INVENTION

The invention relates to a polyurethane obtainable by reacting a polyol composition comprising a highly branched polysaccharide or an alkoxylated derivative of the same, with a polyisocyanate and to a process for producing the polyurethane. The invention also relates to a mix containing other ingredients required for producing the polyurethane. The highly branched polysaccharide used in the invention comprises randomly bonded glucopyranose units having an average number of 10–100 glucose residues.

BACKGROUND OF THE INVENTION

Polyurethanes are prepared by reacting an organic polyisocyanate with a polyol in the presence of additional components like catalysts, surfactants etc. When preparing polyurethane foams a foaming agent is usually added.

Carbohydrates are known as initiators in the production of polyether polyols or as direct additives to a polyol or blend of polyols as part of the polyurethane formulation. Simple carbohydrates such as sucrose, sorbitol, fructose and glucose have been used to initiate polyether polyols designed to facilitate solely water blown rigid foams as described in U.S. Pat. No. 5,690,855. U.S. Pat. No. 5,185,383 uses hexoses as a polyol starter and U.S. Pat. No. 4,943,597 describes a polyol composition wherein simple carbohydrates such as dextrose, sorbitol, sucrose, alpha-methylgucoside and alpha-hydroxyethylglucoside are suitable initiators for a high molecular weight, high functionality polyol which can be used to make substantially water-blown rigid foams.

More complex carbohydrate units such as cellulose and starches have also been employed in the production of polyurethanes as described in U.S. Pat. No. 4,520,139. Complex carbohydrate units such as pectins, starch or other amylaceous materials may be used in foaming systems with or without an auxiliary blowing agent. The starches may be modified prior to use. Thus in U.S. Pat. No. 4,401,772 methyl glucoside is formed by an acid catalyzed reaction with starch. This is then reacted with a suitable amine and an alkylene oxide to form a polyether polyol. More recently a jet-cooked starch oil composite has been used in conjunction with low molecular weight glycol polyol to make a polyurethane foam with altered characteristics, as described in R. L. Cunningham, et al. *J Appl Polym Sci* 69: 957, 1998. Unmodified cellulose and starches, and polysaccharides have also been converted to polyurethane precursors by alkoxylation and more specifically propoxylation. Formation of polyether polyols resulted in compounds useful as precursors for fat mimetics in U.S. Pat. No. 5,273,772, and in rigid and flexible polyurethanes foams in U.S. Pat. No. 4,585,858. In the process of U.S. Pat. No. 5,273,772, involving carbohydrates capable of having more complex, highly branched and random glucosidic linkages, water must be rigorously removed prior to alkoxylation. The composition of U.S. Pat. No. 4,585,858 can tolerate about 15–23% water when crude starch is one of the initiators, however the document specifically refers to starch-meaning compounds with 1,4 glucosidic linkages derived from any vegetable source with and without chemical modification.

The novel alkoxylated polyol composition specified by the current invention is differentiated from the prior art in that it is derived from a highly branched randomly bonded carbohydrate and may be alkoxylated in the presence of relatively high water content.

As direct additives untreated carbohydrates have been incorporated into polyurethane foams in two ways—1) as a partial or complete replacement for the polyol component, and 2) as an unreacted additive or filler. The carbohydrate can be introduced into the foam starting materials either as a solution or as a fine solid. When added as a solution, the hydroxyl groups on the carbohydrate can react with the isocyanate component and become chemically incorporated into the structure of the polyurethane. Examples of carbohydrates include certain starches, corn syrup, cellulose, pectin as described in U.S. Pat. No. 4,520,139, mono- and disaccharides as described in U.S. Pat. Nos. RE31,757, 4,400,475, 4,404,294, 4,417,998, oligosaccharides as described in U.S. Pat. No. 4,404,295 and pregelatinized starch as described in U.S. Pat. No. 4,197,372. As a solid dispersion, the carbohydrate may be inert in the polymerization reaction, but is physically incorporated into the foam. The advantage is lower cost and the ability of the carbohydrates to char upon combustion, preventing further burning and/or dripping of the foam and reducing smoke formation as described in U.S. Pat. Nos. 3,956,202, 4,237,182, 4,458, 034, 4,520,139, 4,654,375. Starch and cellulose are commonly used for this purpose. The starch or cellulose may also be chemically modified prior to foam formulation as described in U.S. Pat. Nos. 3,956,202 and 4,458,034.

In US 20040014829 polyether polyols for foam applications are based upon at least a first initiator having an average functionality of greater than eight but advantageously less than 18. The first initiator may be made up of molecules of a single functionality greater than eight, alternatively it may comprise a plurality of species having functionalities different from each other. The highest nominal functionality mentioned in such a blend is 33. For example hydrogenated starch hydrolysates, which are formed by breaking the starch molecule into smaller oligomers at the ether bond between glucose rings, may be the first initiator of the application. A second initiator may be used, having lower functionality than the range of functionalities in the first initiator. The application does not mention any highly branched species.

A major issue facing the polyurethane foam industry has been and continues to be its dependence upon fluorocarbon blowing agents. By international agreement, the original Freon type chlorofluorocarbons (CFCs) have already been banned and production of the first round replacement, HCFC 141b was phased-out beginning in 2003. Non-ozone depleting, pentafluoropropane isomers (HFC 245), are currently in production. Eventually all HCFC and HFC production will be phased-out. As production with these blowing agents is phased-out, many formulators have investigated low boiling point hydrocarbons like pentane as alternatives. In addition, the cost of fluorinated blowing agents has risen dramatically, such that the blowing agents are much more expensive than the other major ingredients in foam formulations. Therefore foam formulations are being developed with water to minimize formulation costs.

Carbon dioxide generated by the reaction of water and isocyanate has long been recognized as the foaming mechanism in water-blown polyurethane foams. Since water reacts rapidly and exothermically with isocyanate, control of the reaction in water blown foams is critical. Ways of improving the use of water via catalyst selection have focused on amines as described in U.S. Pat. Nos. 5,162,286 and 6,232,356. However, in many other water-blown foams, water merely initiates foaming by a physical blowing agent vaporized by heat generated from the reaction of water with isocyanate. In other instances, typified by U.S. Pat. Nos. 5,690,855 and 5,686,500, a blend of amine and non amine-initiated polyether polyols was used to improve the predictability of the ensuing polyurethane reaction. An ingredient that will facilitate increased water usage without an auxiliary blowing agent would be of great merit to the industry.

It should be noted that all documents cited in this text ("herein cited documents") as well as each document or reference cited in each of the herein-cited documents, and all manufacturer's literature, specifications, instructions, product data sheets, material data sheets, and the like, as to the product mentioned ii this text, are hereby expressly incorporated herein by reference.

SUMMARY OF THE INVENTION

The present invention relates to polyurethanes which are formed by the reaction between a polyol composition containing isocyanate-reactive hydrogens, and an isocyanate chosen from the class of readily available isocyanato aromatic compounds.

The invention provides polyurethanes by the reaction of an polyisocyanate with a polyol composition comprising a highly branched polysaccharide of randomly bonded glucopyranose units, having an average number of 10–100 glucose residues, or an alkoxylated derivative of the same. The polysaccharide and the derivative both have an average functionality of 30 or more.

The polyol composition may also include monosaccharide units corresponding to the polysaccharide in question and preferably consists of 2–100% of highly branched polysaccharide. The glycosidic bonds may be alpha or beta and may consist of any of the possible combinations, 1,2 to 1,6; 2,1 to 2, 6; etc.

In a preferred embodiment the carbohydrate comprising 2–100% highly branched polysaccharide is alkoxylated e.g. with propylene oxide. Depending upon the desired polyurethane properties, one or more additional polyols selected from a polyester and polyether may also be present.

The invention also relates to a mix for the production of a polyurethane. The mix comprises a polyol composition, at least one catalyst and at least one surfactant. The polyol composition comprises 2–100 % of a highly branched polysaccharide of randomly bonded glucopyranose units, having an average number of 10–100 glucose residues, or an alkoxylated derivative of the same. The polysaccharide and derivative both have an average functionality of 30 or more.

The present invention also provides a process for the production of a polyurethane. The process comprises mixing a polyol composition comprising a highly branched polysaccharide of randomly bonded glucopyranose units, having an average number of 10–100 glucose residues, or an alkoxylated derivative of the same, with at least one surfactant and at least one catalyst, adding an organic polyisocyanate and allowing the mixture to react. The polysaccharide and the derivative both have an average functionality of 30 or more. Additional components may be added to the organic polyisocyanate or to the polyol composition before the two are combined.

BRIEF DESCRIPTION OF THE INVENTION

FIG. 2 shows the summary of the individual linkage distribution in the Fibersol-2® and polydextrose of FIG. 1.

DETAILED DESCRIPTION OF THE INVENTION

The present inventors have surprisingly found that highly branched, water-soluble polysaccharides are suitable for the preparation of polyurethane. Due to the high amount of isocyanate-reactive hydrogens of the highly branched polysaccharides the polyurethane of the invention may be prepared at low isocyanate indexes.

As described above the preferred polyol composition utilized in the process for preparing a polyurethane comprises a highly branched polysaccharide of randomly bonded glucopyranose units having an average number of 10–100 glucose residues. The polyol composition may also comprise an alkoxylated derivative which is a reaction product of the highly branched polysaccharide and an alkylene oxide. The polysaccharide or its alkoxylated derivative has an average functionality of 30 or more. The polysaccharide is referred to as "Polyol A" and its derivative is referred to as "Polyol B".

Unless otherwise specified, the terms used in the present specification and claims shall have the following meanings.

The term "polyurethane" is used both when urethanes and isocyanurates are included. For the purposes of this invention no special distinction is made between polyurethanes and polyisocyanurates.

The term "highly branched" when used to describe the polysaccharide of the invention refers to a polysaccharide which has at least some doubly or triply branched units. A glucopyranose unit which has three linkages is a doubly branched unit and a unit which has four linkages is a triply branched unit. The area (%) of double and/or triple branches in a linkage analysis of the polysaccharide is preferably 0.5–10%, more preferably 1–7% and most preferably 2–5%. Specific examples of such highly branched polysaccharides comprises polydextrose and a polysaccharide produced from starch in a heat treatment process known as pyroconversion.

The term "low index" refers to the ratio of isocyanate groups of the polyisocyanate and hydroxyl groups of the polyol composition [NCO/OH].

In the specification and the claims the term "adding an organic polyisocyanate to a polyol composition" includes combining the two components irrespectively of which is added to which in connection with the process of the present invention.

The term "functionality" of the highly branched polysaccharide and its derivative is dependent upon the average number of glucose residues and refers to the number of active hydroxyl groups per molecule. For the purposes of "functionality," the polysaccharide molecule is defined as low-monomer polysaccharide. Normally in a strict sense functionality refers to the number of isocyanate-reactive hydrogens on molecules in the polyol side of the formulation.

The term "polydextrose" as used herein refers to one example of a highly branched polysaccharide. It includes polymer products of glucose which are prepared from glucose, maltose, oligomers of glucose or hydrolyzates of starch, which are polymerized by heat treatment in a polycondensation reaction in the presence of an acid e.g. Lewis acid, inorganic or organic acid, including monocarboxylic acid, dicarboxylic acid and polycarboxylic acid, such as, but not limited to the products prepared by the processes described in the following U.S. Pat. Nos. 2,436,967, 2,719,179, 4,965,354, 3,766,165, 5,051,500, 5,424,418, 5,578,491, 5,645,647 5,773,604, or 6,475,552, the contents of all of which are incorporated herein by reference.

The term polydextrose also includes those polymer products of glucose prepared by the polycondensation of glucose, maltose, oligomers of glucose or starch hydrolyzates described hereinabove in the presence of a sugar alcohol, e.g. polyol, such as in the reactions described in U.S. Pat. No. 3,766,165. Moreover, the term polydextrose includes the glucose polymers, which have been purified by techniques described in prior art, including any and all of the following but not limited to (a) neutralization of any acid associated therewith by base addition thereto, or by passing a concentrated aqueous solution of the polydextrose through an adsorbent resin, a weakly basic ion exchange resin, a type II strongly basic ion-exchange resin, mixed bed resin comprising a basic ion exchange resin, or a cation exchange resin, as described in U.S. Pat. Nos. 5,667,593 and 5,645,647, the contents of which are incorporated by reference; or (b) decolorizing by contacting the polydextrose with activated carbon or charcoal, by slurrying or by passing the solution through a bed of solid adsorbent or by bleaching with sodium chlorite, hydrogen peroxide and the like; (c) molecular sieving methods, like UF, RO (reverse osmosis), size exclusion, and the like; (d) or enzymatically treated polydextrose or (e) any other recognized techniques known in the art. Among the purification processes used in the art the following may be especially mentioned: bleaching, e.g. using hydrogen peroxide as described in U.S. Pat. No. 4,622,233; membrane technology as described in U.S. Pat. No. 4,956,458; ion exchange e.g. removal of citric acid as described in U.S. Pat. No. 5,645,647 or removal of color/bitter taste as described in U.S. Pat. No. 5,091,015; chromatographic separation, with a strong cation exchanger as described in WO92/12179; hydrogenation, in combination with ion exchange as described in U.S. Pat. No. 5,601,863; U.S. Pat. No. 5,573,794 or with ion exchange and chromatographic separation as described in U.S. Pat. No. 5,424,418; or solvent extraction as described in U.S. Pat. No. 4,948,596; EP 289 461, the contents of said patents being incorporated by reference.

Moreover, the term polydextrose includes hydrogenated polydextrose, which, as used herein, includes hydrogenated or reduced polyglucose products prepared by techniques known to one of ordinary skill in the art. Some of the techniques are described in U.S. Pat. Nos. 5,601,863, 5,620,871 and 5,424,418, the contents of which are incorporated by reference. The term polydextrose also encompasses fractionated polydextrose which is a conventional, known material and can be produced e.g. by the processes disclosed in U.S. Pat. Nos. 5,424,418 and 4,948,596 the contents of which are incorporated by reference.

Polydextrose is commercially available from companies such as Danisco Sweeteners, Staley and Shin Dong Bang. Purified forms of polydextrose are marketed by Danisco Sweeteners under the name Litesse® or Litesse®II and by Staley under the name Stalite III. A reduced form of Litesse® is called Litesse® Ultra. The specifications of the Litesse® polydextrose products are available from Danisco Sweeteners.

A further highly branched polysaccharide is derived by pyroconversion from starch. Starch is made of glucose molecules attached by α-(1,4) bonds, with some branching by means of α-(1,6) bonds. The degree of branching depends on the source of the starch.

The polysaccharide is produced from starch in a heat treatment process known as pyroconversion. Pyrodextrins are starch hydrolysis products obtained in a dry roasting process either using starch alone or with trace levels of acid catalyst. The first product formed in this reaction is soluble starch, which in turn hydrolyzes further to form dextrins. The molecular weight of the final product depends on the temperature and duration of heating. Transglucosidation can occur in the dextrinization process, in which rupture of an α-(1,4) glucosidic bond is immediately followed by combination of the resultant fragments with neighboring hydroxyl groups to produce new linkages and branched structures. Thus, a portion of the glycosidic bonds are scrambled. A commercially available pyroconverted starch is called Fibersol-2® and is available from Matsutani America, Inc.

Figure 1:
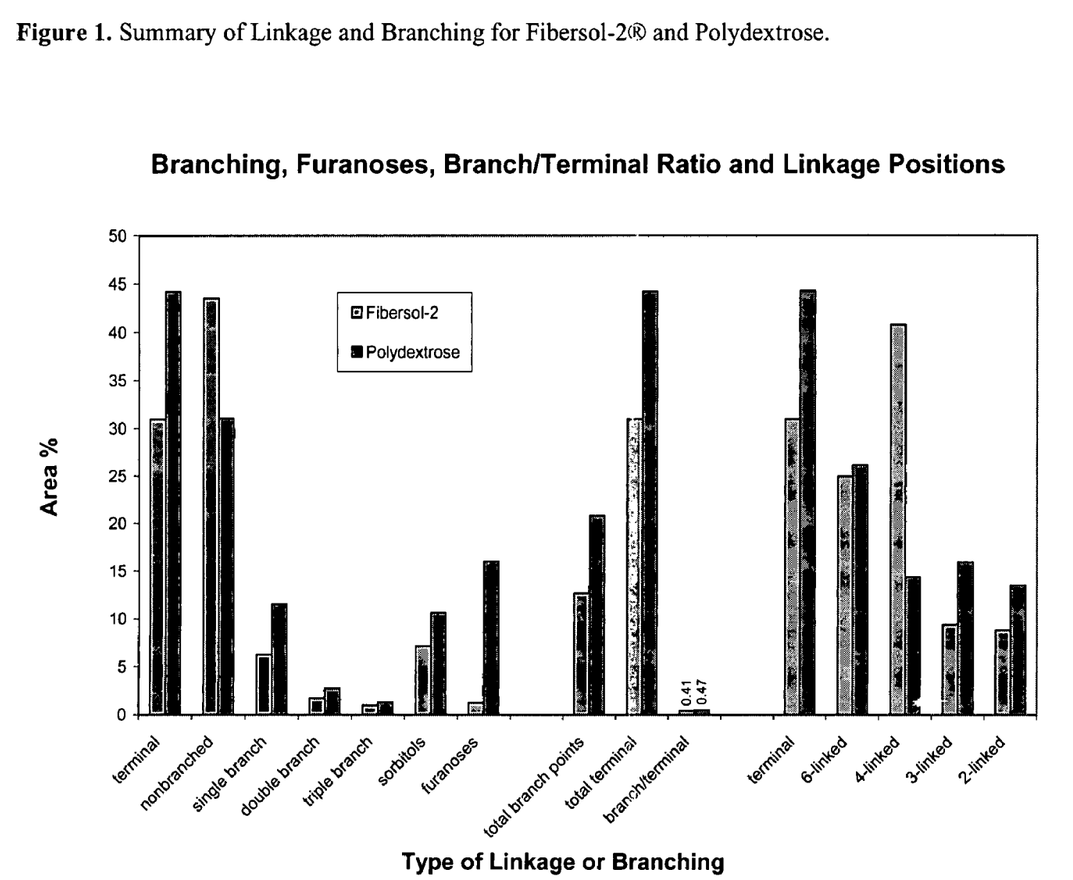
FIG. 1 shows a summary of the linkages and the branching of two polysaccharides useful in the invention.
Figure 2:
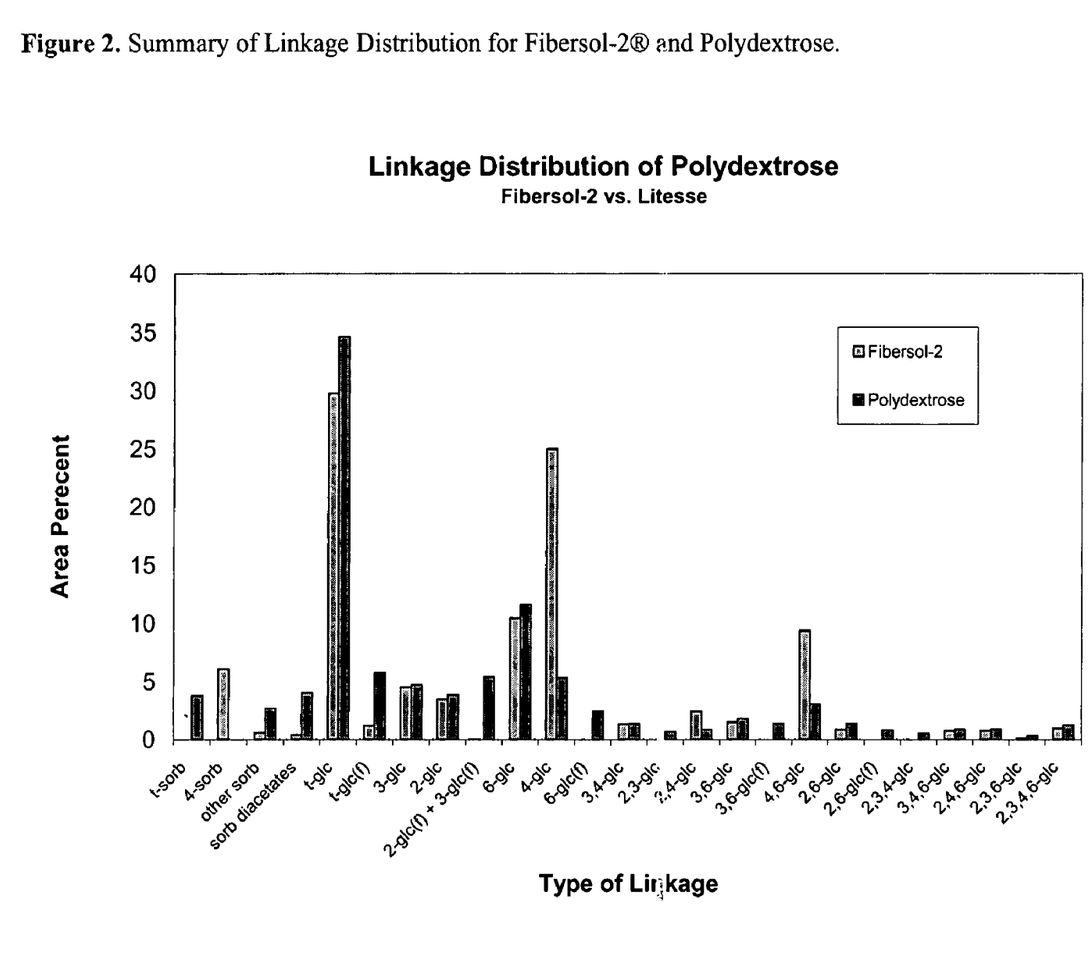
FIG. 2 shows a summary of the linkage distribution of two polysaccharides useful in the invention. More particularly.

FIG. 1 shows the summary of linkages and branching in Fibersol-2® and polydextrose. The Fibersol-2® compared to polydextrose has higher amounts of unbranched and single branched residues, lower content of furanoses and greater amounts of 4- and 4,x- linked residues. Polydextrose, in which 6-linkages predominate, is more highly branched than Fibersol-2® and Fibersol-2®) contains far more 4-linkages, in keeping with its starch origin. By "4-linked" is meant the total fraction of residues having a 4-linkage, including 2,4-, 4,6-, 2,4,6- and 2,3,4,6-linkages.

The polyurethane of the invention can be described as comprising molecules structural components of which are derived from a highly branched polysaccharide of randomly bonded glucopyranose units or an alkoxylated derivative of the polysaccharide. The glucopyranose units have an average number of 10–100 glucose residues and the polysaccharide and the derivative both have an average functionality of 30 or more.

Furthermore, the present invention relates to a mix for the production of a polyurethane comprising a polyol composition, at least one catalyst and at least one surfactant wherein said polyol composition comprises 2–100% of a highly branched polysaccharide or an alkoxylated derivative of the polysaccharide. The polysaccharide has randomly bonded glucopyranose units which have an average number of 10–100 glucose residues. The polysaccharide and the derivative both have an average functionality of 30 or more.

A suitable mix may comprise one or more polyols in a polyol composition, blowing agent(s), catalyst(s), surfactant(s) and additives, for example pigments or fillers or ingredients necessary to achieve a desired property such as flame retardancy, increased durability etc. The following constituents noted in parts per hundred polyol may be added to the mix: water (1–30), catalyst (1–10), surfactant (1–25), crosslinking agent (0–30) and if desired, an auxiliary blowing agent (0–100).

Moreover, a process for the production of polyurethane is provided. The process comprises mixing a polyol composition comprising a highly branched polysaccharide of randomly bonded glucopyranose units, having an average number of 10–100 glucose residues, or an alkoxylated derivative of the same, said polysaccharide and derivative both having an average functionality of 30 or more, with at least one surfactant and at least one catalyst. Thereafter an organic polyisocyanate is added and the mixture is allowed to react.

In a preferred embodiment the polyurethane formed is a rigid, semi-rigid or flexible polyurethane foam and the production of said polyurethane further comprises mixing a blowing agent selected from water and non-water blowing agents with said polyol composition. The mix of the invention may comprise at least one blowing agent selected from water and non-water blowing agents.

Any suitable catalyst and surfactant known in the art may be used to obtain the desired characteristics. The catalyst may be selected from the group consisting of tertiary amines and metallic salts or mixtures thereof. Amine catalysts can include, but are not limited to methyl morpholine, triethylamine, trimethylamine, triethylenediamine and pentamethyldiethylenetriamine. Metallic salts can include, but are not limited to tin or potassium salts such as potassium octoate and potassium acetate. A mixture of catalysts is preferred (e.g. Polycat®5, 8,46K; Dabco® K15, 33LV, TMR—all produced by Air Products; Jeffcat® ZF10—produced by Huntsman). Surfactants may be used to aid dimensional stability and uniform cell formation and may be selected from the group consisting of silicone and nonylphenol surfactants. Examples of suitable silicone surfactants are the Dabco® series DC5890, DC 5598, DC5043, DC5357 and DC193—all produced by Air Products. In some foams it is advantageous to use the ethylene oxide adduct of nonylphenol. Suitable examples of this are the Tergitol® (produced by Dow) and Polystep® (produced by Stepan) line of surfactants. The mixture may further comprise a crosslinking agent selected from the group consisting of triethanolamine, glycerin and trimethylol propane. Moreover, additives like pigments or fillers and other additional components may be added.

In one embodiment of the invention the polyol composition consists of 2–100% polysaccharide, and may further comprise 0–98% of one or more additional polyols selected from polyester and polyether. In a preferred embodiment the polyol composition comprises up to 75% polyester polyol, where the polyester polyol preferably is a readily available product of the condensation reaction between a saturated aliphatic or aromatic dicarboxylic acid and a polyhydric alcohol. Examples of dicarboxylic acids include, but are not limited to: succinic, glutaric, adipic, maleic, fumaric, and preferably phthalic, isophthalic and torephthalic. Examples of polyhydric alcohols include, but are not limited to: ethylene glycol, diethylene glycol, propylene glycol, dipropylene glycol, 1,3 propanediol, glycerol, 1,4 butanediol. The most preferred example involves the alcoholysis product of polyethylene terephthalate and excess diethylene glycol, optionally with some or all of the ethylene glycol by-product removed (e.g. Terate® 2541 produced by Kosa, having an hydroxyl value ranging from 225–275 mg-KOH/gm, a functionality of 2.0, an acidity of 0.4–2.0 mg-KOH/gn and an average equivalent weight of 238).

In another preferred embodiment of the invention the polyol composition comprises up to 75% polyether polyol. The polyether polyol is preferably a readily available product of a reaction between an alkylene oxide with an aliphatic or aromatic polyhydric alcohol or amine with a carbohydrate or a mixture of carbohydrates and/or a polyhydric alcohol and/or amine containing alcohols and/or a mixture of polyhydric alcohols and water and/or a propoxylated Mannich base or may be modified as a graft copolymer of an ethylenically unsaturated aliphatic or aromatic substituted or unsubstituted hydrocarbon. Examples of carbohydrates include, but are not limited to glucose, maltose, fructose, sorbitol, sucrose, arabinose, xylitol and xylose, and anhydroglucoses. Examples of polyhydric alcohols include, but are not limited to, ethylene glycol, propylene glycol, 1,3 butanediol, 1,4 butanediol, 1,6 hexanediol, neopentyl glycol, diethylene glycol, dipropylene glycol, pentaerythritol, glycerol, diglycerol, trimethylolpropane, diethanolamine, and triethanolamine. Examples of alkylene oxides include, but are not limited to ethylene oxide, propylene oxide, 1,2-butylene oxide, and 2,3-butyulene oxide. The polyether polyol may be modified by further condensation with ethylene oxide to produce a capped diol or triol. Thus the percentage of primary hydroxyl groups may be increased to no less than 50% and preferably no less than 80%. These polyethers may be further modified by graft polymerization with ethyleneically unsaturated hydrocarbons. Examples of these include, but are not limited to: short chain aliphatic alkyl dienes; styrene and substituted styrene monomers; acrylic and substituted acrylic monomers; and vinyl esters, vinyl ethers and vinyl ketones.

Once formed the polyether polyols may be used individually or as mixtures. Depending upon the polyurethane properties desired, several preferred examples from this group are: mixtures of propoxylated sucrose (45–65%) and propoxylated glycerol (30–60%), having a hydroxyl value ranging from 430–450 mg-KOH/gm (e.g. PolyG® 74–444 produced by Arch); polyols derived from sucrose and/or mixtures of propoxylated sucrose and/or propoxylated diethanolamine and diethanolamine, such as PolyG® 71–357 and 71–450 produced by Arch; glycerol initiated ethylene oxide capped triols with no less than 80% primary hydroxyl groups and 15–20% ethoxylated glycerol with a molecular weight range of 4500–6500 and hydroxyl value 25–35 mg-KOH (e.g. VHP® Triols 85–29 and 85–34 produced by Arch; styrene-acrylonitrile graft copolymers of ethylene oxide end capped alkoxylated glycerol having >20% dispersed solids with an average molecular weight of 6200 and an average hydroxyl value of 27 mg KOH (e.g. Arcol® 34–28 produced by Bayer).

The additional polyols of the polyol composition may include mixtures of polyester and/or polyether polyols.

The polyurethane of the invention is preferably prepared at low isocyanate indexes, rigid foams are however generally made with higher indexes. The ratio of isocyanate groups of the polyisocyanate and hydroxyl groups of the polyol composition of the invention is preferably from 1.2:1 to 1:10, for Polyol A more preferably from 1:2 to 1:7 and for Polyol B more preferably from 1.1:1 to 1:4 and most preferably from 1:1 to 1:3.

The isocyanates in the present invention may come from the class of readily available isocyanato aromatic compounds. Depending upon the desired properties, examples of preferred aromatic isocyanates include 2,4 and 2,6 toluene di-isocyanate (TDI) such as that prepared by the phosgenation of toluene diamine produced by the nitration and subsequent hydrogenation of toluene. The TDI may be a mixture of the 2,4 and 2,6 isomers in ratios of either 80:20 or 65:35 with the more preferred being 80:20 (e.g. TDI 80 produced by Lyondell). Another preferred isocyanate is methylene diphenylisocyanate (MDI) such as prepared by the condensation of aniline and formaldehyde with subsequent phosgenation. The MDI may be a mixture of 2,4' and 4,4' methylene diphenyldiisocyanate as well as compounds having more than two aromatic rings—polymeric-MDI or PMDI (e.g. Lupranate® M20S—produced by BASF, PAPI®27-produced by Dow and Mondur®MR produced by Bayer).

As described above the polyol composition may also comprise an alkoxylated derivative, Polyol B, which is a reaction product of the highly branched polysaccharide and an alkylene oxide.

In another embodiment a co-initiator may additionally be added. The co-initiator may be selected from the group consisting of water, polyhydric alcohols ethylene glycol, propylene glycol, dipropylene glycol, tripropylene glycol, glycerol, glucose, fructose, sucrose, sorbitol and their possible higher molecular weight analogs; alkylated and unalkylated aliphatic and aromatic amines such as mono-, di- and triethanolamine and mixtures thereof.

The alkylene oxide may be selected from the group consisting of ethylene oxide, propylene oxide, 1,2-butylene oxide, and 2,3-butyulene oxide alone, in succession or in mixtures thereof. In the most preferred embodiment the polysaccharide is polydextrose and the alkylene oxide is propylene oxide.

One preferred embodiment is the adduct of hydrogenated or low-acidity forms of Polyol A and propylene oxide with a viscosity between 200 and 1000 cps and an OH number between 200 and 600 mg-KOH/gm.

In one embodiment of the present invention the polysaccharide of the polyol composition consists of randomly cross-linked glucose units with all types of glycosidic bonds, containing minor amounts of a bound sugar alcohol and an acid, and having an average molecular weight between about 1500 and 18,000. The polysaccharide has predominantly 1,6 glycosidic bonds and is a polycondensation product of glucose, maltose or other simple sugars or glucose-containing material such as hydrolyzed starch and a sugar alcohol in the presence of an acid.

Examples of suitable acids include, but are not limited to mono, di or tri carboxylic acid or their potential anhydrides, such as formic, acetic, benzoic, malonic, fumaric, succinic, adipic, itaconic, citric and the like, and/or a mineral acids, such hydrochloric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid; acidic alkali metal or alkaline earth metal salts of the above acids such as sodium bisulfate and sodium bisulfite; or mixtures of these acids (and/or acidic alkali or alkaline earth metals salts) with phosphoric acid and the like at about 0.001–3%. The polysaccharide thus produced will contain minor amounts of unreacted sugar alcohol and/or acid and a mixture of anhydroglucoses (reaction intermediates).

In a preferred embodiment the sugar alcohols are selected from the group consisting of sorbitol, glycerol, erythritol, xylitol, mannitol, galactitol or mixtures thereof, typically at a level of 5–20% by weight, preferably 5–15%, more preferably 8–12%.

The polysaccharide formed may be further purified or modified by a variety of chemical and physical methods used alone or in combination. These include, but are not limited to: chemical fractionation, extraction with organic solvents, neutralization with a suitable base, purification by chromatography (such as ion exchange or size exclusion), membrane or molecular filtration, further enzyme treatment, carbon treatment and hydrogenation.

In the most preferred embodiment of the invention the polysaccharide is a polycondensation product of glucose, sorbitol and citric acid. The water soluble polysaccharide i.e. Polyol A is produced by reacting glucose with sorbitol (8–12% by weight) in the presence of citric acid (0.01–1% by weight) under anhydrous melt conditions and reduced pressure. The polysaccharide may be purified by ion exchange to produce a form in which the acidity is less than 0.004 meq/gm; referred to as low-acidity Polyol A. Or, it may be purified by a combination of ion exchange and hydrogenation; referred to as hydrogenated Polyol A. Upon hydrog. nation the reducing saccharides are typically less than 0.3% of the total carbohydrate content. Or, it may be further purified by anion exchange and molecular filtration to reduce acidity and the concentration of monomeric reaction by-products; referred to as low-monomer Polyol A. A portion of the water used in processing may be removed to achieve the desired moisture content. In the low-acidity and hydrogenated forms the polysaccharide constitutes about 90% of the total carbohydrate content.: the remainder consisting of glucose, sorbitol and anhydroglucoses. In the low-monomer form the polysaccharide constitutes 99+% of the total carbohydrate content. The water content in all cases may also be adjusted to allow milling as either a coarse or fine powder. This polysaccharide is preferably a polydextrose.

In another embodiment of the invention the polysaccharide has predominantly beta-1,4 linkages and a varying number of glucose residues which are hydrolyzed from starch to form dextrins and subsequently linked to form branched structures. In this embodiment the polysaccharide is preferably pyroconverted starch.

In other embodiments of the invention the polyurethanes may be obtained by reacting the polyisocyanate and the polyol composition in the presence of at least one catalyst and/or in the presence of at least one surfactant. Crosslinking agents, additives like pigments or fillers and other additional components may be added. Although, the highly branched polysaccharide mainly reacts with the isocyanate, in some embodiments of the invention it can also serve as filler.

The polyurethanes of the present invention are foams, adhesives, paints or if water is removed even rigid plastic. More specifically the polyol can also be used as a partial replacement for polymer polyols in high resilient (HR) molded flexible foam applications. High resilient foams are for example used as cushion material in household furnishings and automobiles.

In a preferred embodiment the polyurethane is a rigid, semi-rigid or flexible polyurethane foam. In this embodiment the polyurethane foam may be obtained by reacting said polyisocyanate and said polyol composition in the presence of at least one blowing agent selected from water and non-water blowing agents. The non-water auxiliary blowing agents may be low-boiling organic liquids such as acetone, methyl, formate, pentane, isopentane, n-pentane or cyclopentane, HCFC 141, HFC 245, HFC 365, HFC 134, HFC 227 or a mixture thereof.

In yet another preferred embodiment the polysaccharide is a polydextrose and the polyurethane foam is obtained by reacting a polyisocyanate, a polyol composition comprising 2–100% polydextrose, at least one catalyst, at least one surfactant and at least one blowing agent selected from water and non-water agents.

A preferred process for the production of the polyurethane foam comprises mixing a polyol composition comprising 2–100% polydextrose with at least one surfactant, at least one catalyst and at least one blowing agent selected from water and non-water agents, adding an organic polyisocyanate and allowing the mixture to foam. In all of the polyurethane embodiments of the present invention special additives, such as fillers, flame retarding agents, crosslinking agents and agents for increased durability may be included. Such additives are preferably added in amounts which are common in the art and thus well known to those skilled in the art. However, a special filler of the present invention comprises the branched polysaccharide which is included in the polyol composition of the invention.

The following examples are given to further illustrate the invention and are not intended to limit the scope thereof. Based on the above description a person skilled in the art will be able to modify the invention in many ways to provide polyurethanes with a wide range of defined properties.

EXAMPLE 1

To make polyurethane foams of the present invention, reagents listed as Side A in the proportions indicated in Table 1 were added together in a suitably sized reaction vessel and agitated by high speed overhead stirring. When used, the blend containing lower boiling 1,1,1,3,3-pentafluoropropane was allowed to cool after mixing and additional blowing agent was added as needed to account for volatile loss during mixing. Next the isocyanate component was added to the resulting mix accompanied by stirring at high speed for 10–15 seconds. The mixture was allowed to stand for 0–30 seconds during which time the foam began to rise and solidify. After about 3–5 minutes the foam was solid and could be cut into test pieces. The densities were measured on either cylindrical or rectangular specimens. Compressive properties were measured parallel to foam rise per ASTM D-575 at 0.5 in/min rate of compression using an MTS universal tester. The moisture content of Polyol A was determined by refractive index or loss-on-drying.

Low-monomer polydextrose as Polyol A stabilized the rigid foam formation with respect to an increasing amount of water in the absence of a HCFC blowing agent. The polyol A was added to a blend of polyether and polyester with increasing amounts of water. The foams of the present invention (formulations 4–6) were of low density produced with moderate expansion without shrinkage and having fine cell structure. Formulations with water only (formulations 1–3) yielded inadequate foam formation and subsequent collapse.

TABLE 1

|  | 1 | 2 | 3 | 4 | 5 | 6 |
| --- | --- | --- | --- | --- | --- | --- |
| Side A |  |  |  |  |  |  |
| Terate ® 2541 | 62 | 62 | 62 | 54 | 51 | 51 |
| PolyG ® 74-444 | 38 | 38 | 38 | 34 | 32 | 32 |
| Polyol A |  |  |  | 12 | 17 | 17 |
| auxiliary blowing agent |  |  |  |  |  |  |
| water | 1.4 | 2.1 | 2.8 | 1.2 | 1.7 | 2.3 |
| surfactant | 3.1 | 3.1 | 3.1 | 2.7 | 2.6 | 2.6 |
| catalyst | 4.7 | 4.7 | 4.7 | 4.1 | 3.9 | 3.9 |
| Isocyanate (PMDI) | 76 | 76 | 76 | 68 | 64 | 64 |

TABLE 1-continued

| Index | 0.80 | 0.72 | 0.66 | 0.57 | 0.46 | 0.44 |
|---|---|---|---|---|---|---|
| Polyol A % water | | | | 5.6 | 5.6 | 5.6 |
| Density | | | | 2.6 | 2.6 | 2.2 |
| Modulus | | | | 313 | 139 | 170 |
| Yield | | | | 20 | 27 | 40 |
| Comments | increasing expansion w/ collapse | increasing expansion w/ collapse | moderate expansion w/ minor collapse | | | moderate expansion w/o shrinkage |

| | 7 | 8 | 9 | 10 |
|---|---|---|---|---|
| Side A | | | | |
| Terate ® 2541 | 62 | 62 | 56 | 51 |
| PolyG ® 74-444 | 38 | 38 | 35 | 32 |
| Polyol A | | | 9 | 17 |
| auxiliary blowing agent | 4.5 | 4.5 | 4.1 | 3.7 |
| water | 0.3 | | | |
| surfactant | 1.3 | 1.3 | 1.1 | 1.0 |
| catalyst | 2.6 | 3.5 | 3.4 | 3.1 |
| Isocyanate (PMDI) | 68 | 68 | 61 | 56 |
| Index | 0.87 | 0.92 | 0.65 | 0.50 |
| Polyol A % water | | | 5.6 | 5.6 |
| Density | 7.2 | 6.8 | 4.5 | 3.4 |
| Modulus | 10380 | 6352 | 3858 | 2223 |
| Yield | 287 | 134 | 76 | 40 |
| Comments | coarse cells | | | finer cell structure than ex 7 |

Low-monomer polydextrose as Polyol A also stabilized the rigid foam formation in systems co-blown with an auxiliary agent such as HCFC 141b. In the present invention, exogenous water may be absent (formulations 9 and 10) since water is also present in measurable amounts in the Polyol A. In comparison to formulations 7 and 8, foams of the present invention had an improved density profile, finer cell structure and required less isocyanate to produce an equal volume of foam. Water may be added to systems in conjunction with an auxiliary blowing agent such as HCFC 141b.

EXAMPLE 2

An improved foam was formed when Polyol A as low-monomer polydextrose was added in the presence of decreasing concentrations of HCFC 141b and in its absence (formulations 12–14 of the current invention; formulation 11 for comparison, see Table 2).

Low-monomer polydextrose as Polyol A was used to replace some or all of the sucrose based polyol. In systems in which only an aromatic polyester polyol was present, rigid foam with coarse cells was formed when either water or HCFC 141b were the sole blowing agent (formulations 15, 16). The addition of the Polyol A to a solely water-blown system resulted in a foam with density and modulus similar to that with either water or HCFC 141b as the blowing agent, however the cell structure was much finer and the isocyanate requirement was less (formulation 17).

TABLE 2

| | 11 | 12 | 13 | 14 | 15 | 16 | 17 |
|---|---|---|---|---|---|---|---|
| Side A | | | | | | | |
| Terate ® 2541 | 62 | 60 | 60 | 60 | 100 | 100 | 72 |
| PolyG ® 74-444 | 38 | 37 | 37 | 37 | | | |
| Polyol A | | 3 | 3 | 3 | | | 28 |
| auxiliary blowing agent | 5 | 5 | 2.7 | | 7.3 | | |
| water | 0.7 | 0.7 | 0.7 | 0.7 | | 2.8 | 0.4 |
| surfactant | 2.4 | 2.4 | 2.3 | 2.3 | 2.0 | 2.0 | 1.5 |
| catalyst | 4.0 | 3.9 | 3.9 | 4.5 | 3.1 | 3.1 | 2.2 |
| Isocyanate (PMDI) | 72 | 70 | 73 | 73 | 110 | 110 | 79 |
| Index | 0.85 | 0.76 | 0.80 | 0.80 | 1.97 | 1.13 | 0.61 |
| Polyol A % water | | 5.6 | 5.6 | 5.6 | | | 5.6 |
| Density | 3.21 | 2.98 | 3 | 3.52 | 3.9 | 3.4 | 4.0 |
| Modulus | 650 | 672 | 1172 | 902 | 2999 | 1926 | 2388 |
| Yield | 72 | 160.5 | 73.8 | 87.9 | 64 | 40 | 45 |
| Comments | | cell size reduced | cell size reduced | cell size reduced | coarse cells | very coarse | fine cells |

TABLE 2-continued

| 11 | 12 | 13 | 14 | 15 | 16 | 17 |
|---|---|---|---|---|---|---|
| | ver. ex. 11 | ver. ex. 11 | ver. ex. 11 | | cells | |

EXAMPLE 3

Polydextrose was also used to make semi-rigid and rigid foams in systems with high water content without auxiliary blowing agent (see Table 3). In these systems polydextrose replaces the traditional polyester and polyether polyols. In formulations 20 through 22, hydrogenated polydextrose as Polyol A was used with nominal 30% water content. In formulations, 23 through 26, low-acidity polydextrose as Polyol A was used with nominal 30% water content. In comparison to control foam formulations 18 and 19, foams of the present invention had cell structure upon gellation ranging from medium to very fine—exhibiting no shrinkage or collapse. The densities ranged from 0.8 to 1.9 pcf depending upon the isocyanate index.

TABLE 3

| | 18 | 19 | 20 | 21 | 22 | 23 | 24 | 25 | 26 |
|---|---|---|---|---|---|---|---|---|---|
| Side A | | | | | | | | | |
| VHP ® 85-29 | 100 | 100 | 58 | 58 | 48 | 73 | 58 | 58 | 48 |
| Polyol A | | | 42 | 42 | 52 | 27 | 42 | 42 | 52 |
| dipropylene glycol | 20 | 20 | | | | | | | |
| triethanol amine | 5.5 | 5.5 | 3.2 | 3.2 | 2.6 | 6.7 | 3.2 | 3.2 | 2.6 |
| water | 22 | 22 | 6.3 | 6.3 | | | | | |
| nonylphenol surfactant | | 9 | 21 | 21 | 17 | | 21 | 21 | 17 |
| silicone surfactant | | | 2.1 | 2.1 | | 4.0 | 2.1 | 3.2 | 2.6 |
| catalyst | 4.6 | 4.6 | 2.4 | 2.4 | 2.0 | 2.3 | 2.4 | 2.4 | 2.0 |
| Isocyanate - PMDI | 183 | 183 | 106 | 145 | 137 | 71 | 134 | 134 | 119 |
| Index | 0.47 | 0.47 | 0.27 | 0.37 | 0.38 | 0.35 | 0.45 | 0.45 | 0.33 |
| Polyol A % water | | | 29.6 | 29.6 | 29.6 | 29.5 | 29.5 | 29.5 | 29.5 |
| Density (pcf) | 0.61 | | 0.81 | 0.79 | 0.8 | 1.88 | 0.91 | 0.9 | 0.91 |

The material produced in this way is semi-rigid and has properties suitable for protecting fragile objects from damage during shipment or storage.

EXAMPLE 4

In formulations 27, 28, and 28a Polyol A comprises hydrogenated polydextrose, reduced acidity polydextrose and pyroconverted starch, respectively. Polyol A was the sole polyol and was used in the absence of auxiliary blowing agent (see Table 4). The resulting foams had low density, fine cell structure and readily absorbed water without deformation.

Polyol A was also used to make high resilience flexible foams as shown in formulations 30 to 32. An aqueous solution of low-acidity polydextrose as Polyol A was added to Side A and reacted with TDI 80/20. In comparison to control foam formulation 29, which had very slight crown shrinkage, foams of the present invention (30 through 32) exhibited no shrinkage, had a fine cell structure and a density of <2 pcf.

TABLE 4

| | 27 | 28 | 28a | 29 | 30 | 31 | 32 |
|---|---|---|---|---|---|---|---|
| Side A | | | | | | | |
| VHP ® 85-34 | | | | 60 | 57 | 59 | 59 |
| Arcol ® 34-28 | | | | 40 | 38 | 39 | 39 |
| Polyol A | 100 | 100 | 100 | | 5 | 2 | 2 |
| water | | | | 4.5 | 2.9 | 3.7 | 3.7 |
| nonylphenol surfactant | 20 | 20 | 20 | | | | |
| silicone surfactant | | | | 2.0 | 0.5 | 1.0 | 1.0 |
| catalyst | 2.4 | 2.4 | 3.4 | 1.2 | 1.1 | 1.2 | 1.2 |
| Isocyanate - PMDI | 100 | 100 | 100 | | | | |

TABLE 4-continued

| | 27 | 28 | 28a | 29 | 30 | 31 | 32 |
|---|---|---|---|---|---|---|---|
| Isocyanate - TDI | | | | 52 | 49 | 51 | 45 |
| Index | 0.15 | 0.15 | 0.15 | 1.07 | 0.96 | 1.03 | 0.91 |
| Polyol A % water | 29.6 | 29.5 | 26.1 | | 29.5 | 29.5 | 29.5 |
| Density (pcf) | 1.16 | 1.04 | 0.99 | | 1.2 | 1.4 | 1.6 |

EXAMPLE 5

The lower acidity and hydrogenated forms of polydextrose as Polyol A were modified by reaction with propylene oxide with water as the co-initiator to form novel Polyol B: prepared as follows.

A 2 liter Parr pressure reactor was charged with polydextrose and solid KOH in the amounts shown in Table 6. The reactor was checked for leaks with $N_2$ @ 50 psi for 10 minutes and then purged 3 times with $N_2$ at 25 psi. Next 70 g of propylene oxide was charged and the reactor was heated to 120° C. Cooling was applied to maintain the temperature between 120 °–130° C. The propylene oxide was added discontinuously from a remote cylinder until the desired calculated hydroxyl number was achieved. The reactor was then purged three times with N₂, pressurized to 60 psi and then the new polyol was removed from the reactor through the sampling tube. The catalyst was then neutralized with an equivalent amount of H₃PO₄, heated and stirred for 30 minutes on a rotary evaporator and then celite and Magnesol (30/40) were added and the slurry filtered in a filter press at 20 psi. The isolated yield was recorded and the polyol color noted. Formulations 39 through 42 list the weights charged and key properties of the isolated polyols (see Table 6). The hydroxyl number was determined by ASTM 4274-C.

These novel polyols were tested for compatibility with a newer generation auxiliary blowing agent, 1,1,1,3,3-pentafluoropropane (HFC245fa). Complete homogeneity was observed when HFC245fa was added to the Polyol B series at both 10% and 50% w/w regardless of the level propylene oxide incorporated. Polyol B of formulation 39 was used in conjunction with PMDI and HFC245fa to make rigid foams of formulations 35 and 36. Polyol B of formulation 41 was used in conjunction with PMDI and HFC245fa to make rigid foams of formulations 33 and 34. A fine cell structure and low density was obtained in each case with and without small amounts of water. Polyol B of formulation 40 was reacted with PMDI in the presence of a trimerization catalyst to produce a good, medium-to-fine cell structure rigid foam (formulation 37). Comparison formulation 38 without polyol produced very friable foam with coarse cells.

TABLE 5

|  | 33 | 34 | 35 | 36 | 37 | 38 |
|---|---|---|---|---|---|---|
| Side A |  |  |  |  |  |  |
| Polyol B | 100 | 100 | 100 | 100 | 100 |  |
| water | 1.2 |  | 1.2 |  |  |  |
| auxiliary blowing agent | 27 | 27 | 27 | 27 | 100 | 83 |
| silicone surfactant | 2.0 | 2.0 | 2.0 | 2.0 | 10 | 8 |
| catalyst | 4.5 | 4.5 | 4.5 | 4.5 | 10 | 8 |
|  | 0 | 0 | 0 | 0 | 0 |  |
| Isocyanate - PMDI | 131 | 112 | 115 | 96 | 670 | 558 |
| Index | 1.10 | 1.10 | 1.10 | 1.11 |  |  |
| Density (pcf) | 1.8 | 2.4 | 1.6 | 2.2 | 2.4 | 2.3 |

Based on the above description it is evident that the highly branched polysaccharides used in the present invention improve the characteristics of polyurethanes.

Foams of the present invention have an improved density profile, finer cell structure and require less isocyanate to produce an equal volume of foam. Furthermore, a finer cell structure and a lower isocyanate requirement can be achieved with less or no non-water blowing agent.

The invention claimed is:

1. A polyurethane obtained by reacting a polyisocyanate and a polyol composition comprising a highly branched polysaccharide of randomly bonded glucopyranose units, having an average number of 10–100 glucose residues, or an alkoxylated derivative of the same, said polysaccharide and derivative both having an average functionality of 30 or more.

2. The polyurethane of claim 1, wherein said polyol composition consists of 2–100 % by weight of said polysaccharide.

3. The polyurethane of claim 1, wherein said polysaccharide is water-soluble.

4. The polyurethane of claim 1, wherein the ratio of isocyanate groups of said polyisocyanate and hydroxyl groups of said polyol composition is from 1.2:1 to 1:10, preferably from 1:2 to 1:7.

5. The polyurethane of claim 1 wherein said polysaccharide consists of randomly cross-linked glucose units with all types of glycosidic bonds, containing minor amounts of a bound sugar alcohol and an acid, and having an average molecular weight between about 1500 and 18,000.

6. The polyurethane of claim 5 wherein said polysaccharide has predominantly 16 glycosidic bonds.

7. The polyurethane of claim 5, wherein said polysaccharide is a polycondensation product of glucose, maltose or other simple sugars or glucose-containing material such as hydrolyzed starch and a sugar alcohol in the presence of a carboxylic acid.

8. The polyurethane of claim 5, wherein said sugar alcohols are selected from the group consisting of sorbitol, glycerol, erythritol, xylitol, mannitol, galactitol or mixtures thereof.

9. The polyurethane of claim 5 wherein said polysaccharide is a polycondensation product of glucose, sorbitol and citric acid.

10. The polyurethane of claim 5, wherein said polysaccharide is a polydextrose.

11. The polyurethane of claim 5, wherein said polysaccharide is purified by a process selected from fractionation,

TABLE 6

|  |  | 39 | 40 | 41 | 42 |
|---|---|---|---|---|---|
|  |  | Polyol A source material | | | |
|  |  | hydrogenated polydextrose | hydrogenated polydextrose | low acidity polydextrose | low acidity polydextrose |
| Weights Charged (gm) | Polyol A | 100 | 120 | 200 | 200 |
|  | propylene oxide | 640 | 1427 | 1096 | 1478 |
|  | KOH | 1.7 | 7.7 | 6.2 | 7.9 |
|  | Polyol A % water | 29.5 | 29.5 | 29.6 | 29.6 |
| Novel Polyol B Properties | viscosity (cps) | 540 | 240 | 410 | 300 |
|  | OH # | 364 | 219 | 429 | 306 |
|  | equivalent weight | 154 | 256 | 131 | 183 |
|  | color | slight yellow | darker yellow | dark brown | dark brown | extraction, neutralization, purification by chromatography, filtration, enzyme treatment, carbon treatment and hydrogenation.

12. The polyurethane of claim 1, wherein said polysaccharide has predominantly beta-1, 4 linkages and a varying number of glucose residues which are hydrolysed from starch to form dextrins and subsequently linked to form branched structures.

13. The polyurethane of claim 12, wherein said polysaccharide is a pyroconverted starch.

14. The polyurethane of claim 1, wherein said polyurethane further comprises additional components selected from catalysts, surfactants, crosslinking agents and additives.

15. The polyurethane of claim 1, wherein said polysaccharide acts as a filler.

16. The polyurethane of claim 1, wherein said polyurethane is a rigid, semi-rigid or flexible polyurethane foam.

17. The polyurethane of claim 16, wherein said polyurethane foam is obtained by reacting said polyisocyanate and said polyol composition in the presence of at least one blowing agent selected from water and non-water blowing agents.

18. The polyurethane of claim 17, wherein said non-water blowing agents are low-boiling organic liquids.

19. The polyurethane of claim 17, wherein said non-water blowing agents are acetone, methyl, format, pentane, isopentane, n-pentane or cyclopentane, HCFC 141, HFC 245, HFC 365, HFC 134, HFC 227 or a mixture thereof.

20. The polyurethane of claim 1, wherein said polyol composition further comprises 0–98% by weight of one or more additional polyols selected from polyester and polyether.

21. The polyurethane of claim 20, wherein said polyol composition further comprises up to 75% by weight polyester polyol.

22. The polyurethane of claim 21, wherein said polyester polyol is the product of the condensation reaction between a saturated aliphatic or aromatic dicarboxylic acid and a polyhydric alcohol.

23. The polyurethane of claim 20, wherein said polyol composition comprises up to 75% by weight polyether polyol.

24. The polyurethane of claim 23 wherein said polyether polyol is the product of reaction between an alkylene oxide with an aliphatic or aromatic polyhydric alcohol or amine with a carbohydrate or a mixture of carbohydrates and/or a polyhydric alcohol and/or amine containing alcohols and/or a mixture of polyhydric alcohols and water and/or a propoxylated Mannich base or may be modified as a grate copolymer of an ethylenically unsaturated aliphatic or aromatic substituted or unsubstituted hydrocarbon.

25. The polyurethane of claim 1, wherein said alkoxylated derivative is a reaction product of said highly branched polysaccharide and an alkylene oxide.

26. The polyurethane of claim 25, wherein said alkoxylated derivative is obtainable by reacting additionally a co-initiator.

27. The polyurethane of claim 26, wherein said co-initiator is water, polyhydric alcohols ethylene glycol, propylene glycol, dipropylene glycol, tripropylene glycol glycerol, glucose, fructose, sucrose, sorbitol and their possible higher molecular weight analogs; alkylated and unalkylated aliphatic and aromatic amines such as mono-, di- and triethanolamine and mixtures thereof.

28. The polyurethane of claim 25, wherein said alkylene oxide is selected from the group consisting of ethylene oxide, propylene oxide, 1, 2-butylene oxide, and 2,3-butyulene oxide alone, in succession or in mixtures thereof.

29. The polyurethane of claim 25, wherein said polysaccharide is polydextrose and said alkylene oxide is propylene oxide.

30. A mix for the production of a polyurethane comprising a polyol composition, at least one catalyst and at least one surfactant wherein said polyol composition comprises 2–100% by weight of a highly branched polysaccharide of randomly bonded glucopyranose units, having an average number of 10–100 glucose residues, or an alkoxylated derivative of the same, said polysaccharide and derivative both having an average functionality of 30 or more.

31. The mix of claim 30, wherein said polyurethane is a rigid, semi-rigid or flexible polyurethane foam.

32. The mix of claim 31, wherein said mix further comprises at least one blowing agent selected from water and non-water blowing agents.

33. The mix of claim 32 wherein said non-water blowing agents are low-boiling organic liquids.

34. The mix of claim 30 wherein said catalyst is selected from the group consisting of tertiary amines and metallic salts or mixtures thereof.

35. The mix of claim 30 wherein said surfactant is selected from the group consisting of silicone and nonylphenol surfactants.

36. The mix of claim 30 wherein said polyoi composition further comprises 0–98% by weight of one or more additional polyols consisting of polyester and/or polyether.

37. The mix of claim 30 wherein said alkoxylated derivative is a reaction product of said highly branched polysaccharide and an alkylene oxide.

38. The mix of claim 37, wherein said alkoxylated derivative is obtainable by reacting additionally a co-initiator.

39. The mix of claim 38, wherein said co-initiator is water, polyhydric alcohols ethylene glycol, propylene glycol, dipropylene glycol, tripropylene glycol glycerol, glucose, fructose, sucrose, sorbitol and their possible higher molecular weight analogs; alkylated and unalkylated aliphatic and aromatic amines such as mono-, di- and triethanolamine and mixtures thereof.

40. The mix of claim 37, wherein said mix further comprises a crosslinking agent selected from the group consisting of triethanol amine, glycerin and trimethylol propane and the like.

41. The mix of claim 37, wherein said alkylene oxide is selected from the group consisting of ethylene oxide, propylene oxide, 1, 2-butylene oxide, and 2,3-butyulene oxide alone, in succession or in mixtures thereof.

42. A process for the production of a polyurethane comprising:
   a. mixing a polyol composition comprising a highly branched polysaccharide of randomly bonded glucopyranose units, having an average number of 10–100 glucose residues, or an alkoxylated derivative of the same, said polysaccharide and derivative both having an average functionality of 30 or more, with at least one surfactant and at least one catalyst,
   b. adding an organic polyisocyanate
   c. allowing the mixture to react.

43. The process of claim 42, wherein said polyol composition consists of 2–100% by weight of said polysaccharide.

44. The process of claim 42, wherein said polyurethane is a rigid, semi-rigid or flexible polyurethane foam, the production of said polyurethane further comprising mixing a blowing agent selected from water and non-water blowing agents with said polyol composition.

45. The process of claim 44 wherein said non-water blowing agents are low-boiling organic liquids.

46. The process of claim 42, wherein the ratio of isocyanate groups of said polyisocyanate and hydroxyl groups of said polyol composition is from 1.2:1 to 1:10, preferably from 1:2 to 1:7.

47. The process of claim 42 wherein said catalyst is selected from the group consisting of tertiary amines and metallic salts or mixtures thereof.

48. The process of claim 42 wherein said surfactant is selected from the group consisting of silicone and nonylphenol surfactants.

49. The process of claim 42 wherein said polyurethane further comprises crosslinking agents and additives.

50. The process of claim 42 wherein said polyol composition further comprises 0–98% by weight of one or more additional polyols selected from polyester and polyether.

51. The process of claim 42 wherein said alkoxylated derivative is a reaction product of the highly branched polysaccharide and an alkylene oxide.

52. The process of claim 51, wherein said alkoxylated derivative is obtainable by reacting additionally a co-initiator.

53. The process of claim 52, wherein said co-initiator is water, polyhydric alcohols ethylene glycol, propylene glycol, dipropylene glycol, tripropylene glycol glycerol, glucose, fructose, sucrose, sorbitol and their possible higher molecular weight analogs; alkylated and unalkylated aliphatic and aromatic amines such as mono-, di- and triethanolamine and mixtures thereof.

54. A polyurethane foam obtained by reacting a polyisocyanate, a polyol composition comprising 2–100% by weight of an alkoxylated or non-alkoxylated highly branched polydextrose of randomly bonded glucopyranose residues, having an average of 10–100 glucose residues, at least one catalyst, at least one surfactant and at least one blowing agent selected from the group consisting of water and non-water agents.

55. A process for the production of a polyurethane foam comprising:

a. mixing a polyol composition comprising 2–100% by weight of an alkoxylated or non-alkoxylated highly branched polydextrose of randomly bonded glucopyranose units, having an average of 10–100 glucose residues with at least one surfactant, at least one catalyst and at least one blowing agent selected from the group consisting of water and non-water agents, b. adding an organic polyisocyanate and c. allowing the mixture to foam.

* * * * *